INVENTORS
HANS H. CLEMENT
ROBERT KAPOUN

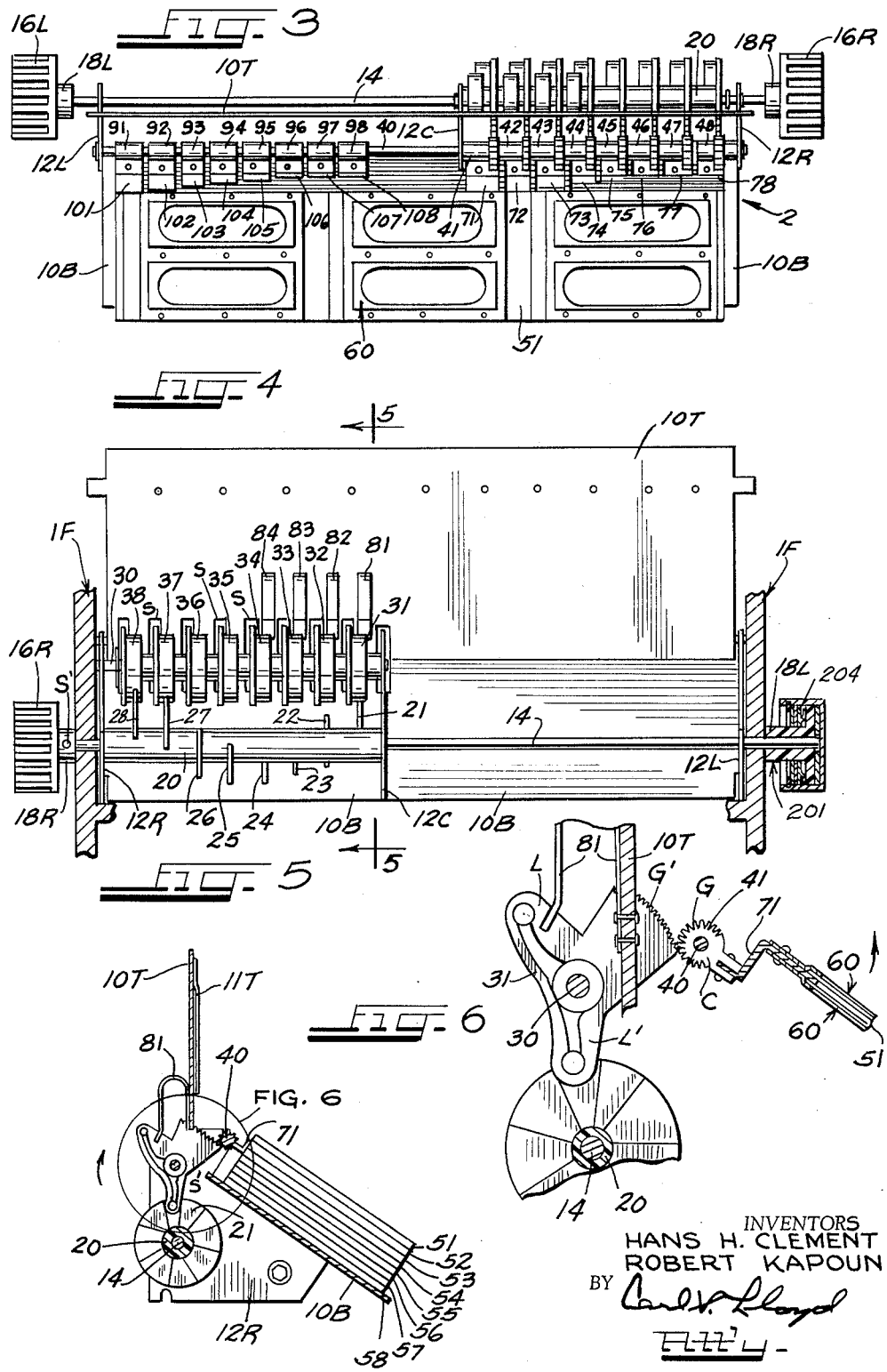

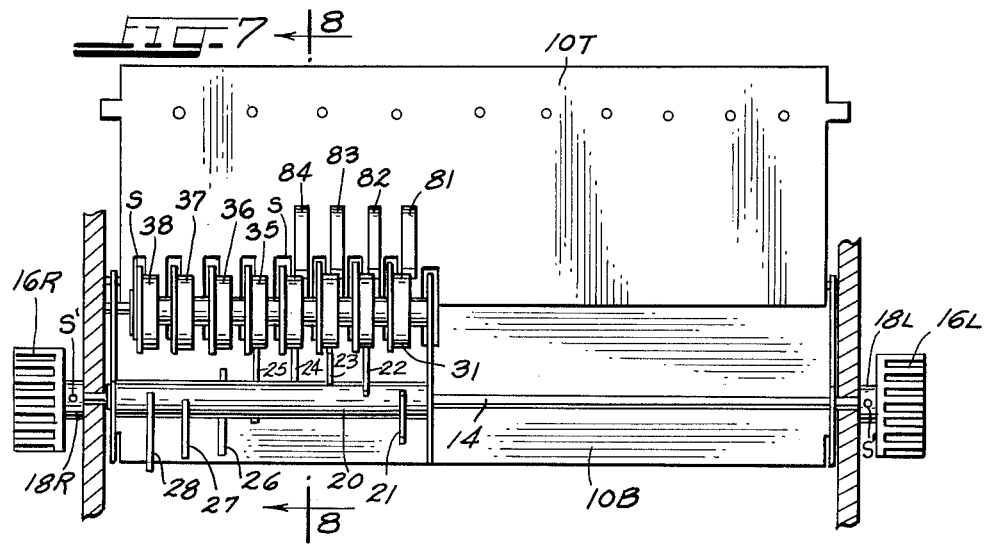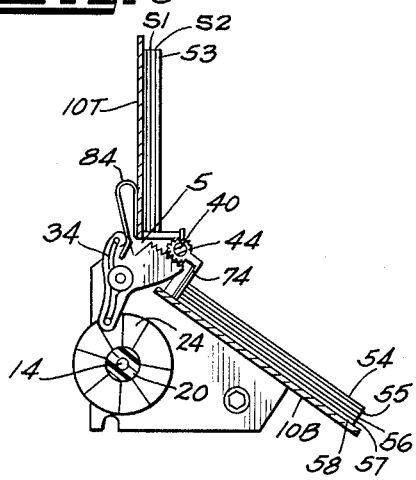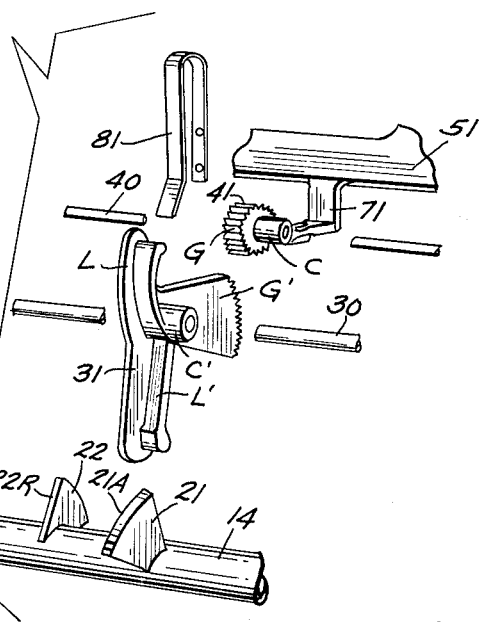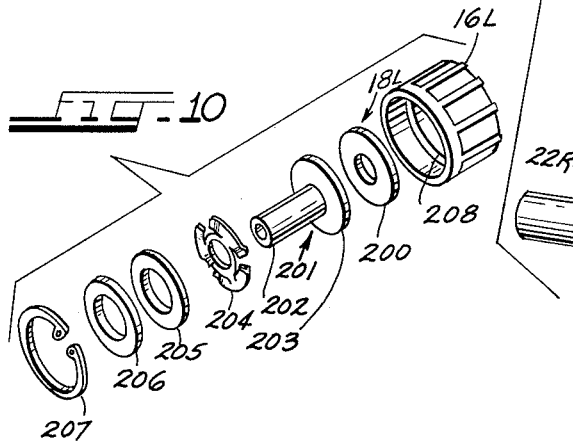
INVENTORS
HANS H. CLEMENT
ROBERT KAPOUN

United States Patent Office 3,220,128
Patented Nov. 30, 1965

3,220,128
PROGRAM HOLDER ASSEMBLY
Hans H. Clement, Chicago, and Robert Kapoun, Glenview, Ill., assignors to The Seeburg Corporation, Chicago, Ill., a corporation of Delaware
Filed May 8, 1963, Ser. No. 278,941
8 Claims. (Cl. 40—104)

This invention relates to a device for leafing through a stacked plurality of plates and, in a described embodiment, to a program selector device which is adapted to display a variety of program titles by appropriate rotation of a stacked plurality of plates containing informative indicia thereupon.

Coin operated phonograph systems are in wide commercial use today both in the United States and abroad. Usually, these systems comprise a main phonograph console which contains a plurality of records, means for selecting a given record for play, and means for playing the selected record, as well as a series of auxiliary selector units which may be positioned throughout a commercial establishment. For example, a typical commercial phonograph installation in a restaurant comprises the indicated main console and a series of wall box selector units which are positioned at various locations in the restaurant, such as at each booth thereof. This arrangement provides a convenience for a given consumer who is situated in the booth in that he may deposit the requisite coin and select a given record for play without directly approaching the main console unit. Obviously, it is necessary that the auxiliary selector unit be as compact as is possible while still providing the whole gamut of record titles for inspection and selection by the consumer. Furthermore, the general demand for stereo playback (which requires the inclusion of dual speakers even in the auxiliary selector unit) further necessitates that the program selector portion of the unit be as compact as possible.

Heretofore, such auxiliary phonograph selector units have been provided in the form of a relatively small cabinet containing a series of stacked vertically aligned plates which are adapted for rotation about a common shaft within the cabinet. These plates are provided with appropriate informative indicia on either side thereof so that the consumer may leaf through the plates in order to inspect and select the record titles which he desires to play. Although this arrangement of vertically aligned plates is relatively simple, surprisingly, the process of leafing through the plates is somewhat laborious in that each plate must usually be manually rotated approximately 180° through a vertical plane in order to view the informative indicia contained on both sides of each of the plates.

This invention provides an improved arrangement in the form of mechanically operated aligned stacked plates which under manual signal can be rotated in a given upward direction and can likewise be rotated in a reverse downward direction through a horizontal plane, wherein the aid of gravity is enlisted to return a moved plate to its original disposition. Basically, the subject invention comprises a housing adapted for placement within an auxiliary commercial phonograph selector unit; a shaft rigidly positioned in the housing; a stacked plurality of superimposed plates which are affixed to the shaft for rotation relative thereto through a horizontal plane; and manually operated means, including a novel slip clutch arrangement, for gear driving each of the plates through the described rotation. As a further feature, means are provided to enlist the aid of gravity to return each of the plates to its original disposition, which means include, where necessary, the utilization of a simple spring arrangement for pushing a plate over the center of the shaft to an unstable position such that the plate may fall downwardly through the described horizontal plane under the influence of gravity.

Therefore, it is a general object of this invention to provide a unique device for positioning any one of a stacked plurality of superimposed plates in a predetermined orientation.

In a more specific sense, it is an object of this invention to provide such a device for utilization in a commercial phonograph auxiliary selector unit.

It is another object of this invention to provide a selector device which is mechanical in nature and which requires a minimum amount of manual force to complete its operation.

It is a still further object of this invention to provide such a selector device which is capable of operation by rotation of a stacked plurality of plates containing informative indicia on either side thereof through a horizontal plane, in order to save space in the overall dimensions of the auxiliary selector unit.

These and other objects, advantages, and features of the subject invention will hereinafter appear, and, for purposes of illustration, but not of limitation, an exemplary embodiment of the subject invention is shown in the appended drawings, in which:

FIGURE 3 is a top plan view of the structure shown in FIGURE 2, with all of the stacked plates thereof being in a downwardly arranged disposition;

FIGURE 4 is a rear elevational view of the structure shown in FIGURE 3, with one of the knobs thereof being shown in section in order to illustrate the slip clutch assembly;

FIGURE 5 is a sectional view taken along the line 5—5 of FIGURE 4;

FIGURE 6 is an enlarged fragmentary view of a portion of the structure shown in FIGURE 5;

FIGURE 7 is a view similar to FIGURE 4, showing the structure in a different stage of its operation;

FIGURE 8 is a sectional view similar to FIGURE 5, taken along the line 8—8 of FIGURE 7;

FIGURE 9 is an enlarged fragmentary exploded view in perspective of the mechanical means for effecting rotation of the stacked program selector plates; and FIGURE 10 is an exploded view in perspective of the slip clutch assembly shown in FIGURE 4.

Figure 1:
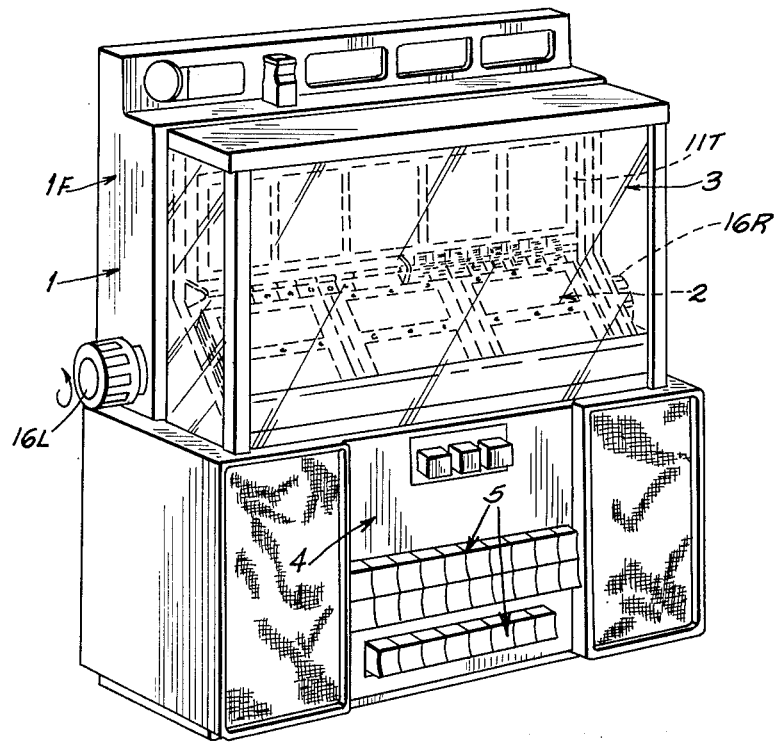
FIGURE 1 is a perspective view of a commercial phonograph auxiliary selector unit which is equipped with a program holder assembly produced in accordance with the subject invention.
Figure 2:
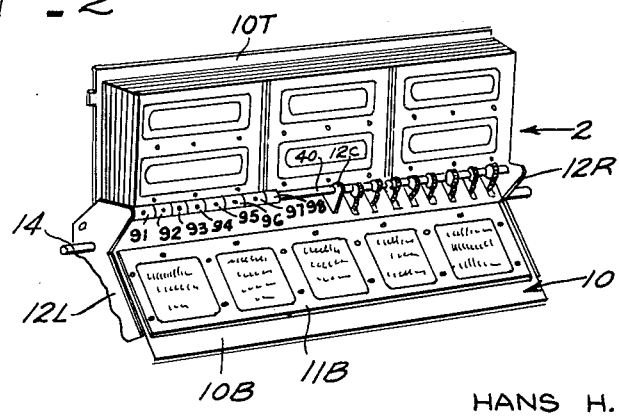
FIGURE 2 is a similar perspective view showing the program holder assembly removed from the cabinet frame of the auxiliary selector unit, with all of the stacked plates thereof being in an upwardly arranged disposition.

With reference to the drawings, FIGURE 1 shows a commercial phonograph auxiliary selector unit 1 which contains a program holder assembly 2 therein. The assembly 2 is illustrated in FIGURE 2 and is shown in phantom lines in FIGURE 1 as positioned within the unit 1 behind a glass or other transparent enclosure 3. The unit 1 is equipped with a control selector panel 4 for the selection of a given record by appropriate depression of the button system 5, which correlates with the indicia indicated by the device 2, in a conventional manner.

The device 2 comprises a housing 10 which is defined by the intersecting frames 10T and 10B. As best shown in FIGURES 2, 5, and 8, the frame 10T is substantially vertical or upright while the frame 10B extends downwardly therefrom in an inclined plane. A grid 11T and a grid 11B are respectively affixed to the frames 10T and 10B (as by rivets), and the grids 11T and 11B are provided with suitable apertures so that informative indicia (e.g., in the form of information printed on cards) may be suitably positioned therein.

The housing 10 further comprises a first end flange 12L, a centrally disposed flange 12C, and a second end flange 12R. A shaft 14 is positioned on the rear or interior side of the housing 10 and is journaled in the flanges 12L, 12C, and 12R of the housing 10 for rotation relative thereto. The opposite ends of the shaft 14 are provided with knobs 16L and 16R respectively, which knobs are affixed to the shaft 14 for rotation therewith by clutch assemblies 18L and 18R respectively. As shown in FIGURES 1 and 4, the housing 10 may be readily positioned within a frame support 1F of the unit 1 with the knobs 16L and 16R being positioned exteriorly thereof (see FIGURE 1). The clutch assemblies 18L and 18R are identical, and the details thereof are shown in the cross-sectional view of FIGURE 4 and in the perspective view of FIGURE 10. As shown in FIGURE 10, the clutch assembly 18L comprises an annular disc 200 which is received in the interior of the knob 16L. The disc 200 is suitably affixed to the knob 16L, as by gluing the members together. A hub element 201, which comprises an elongated cylindrical head 202 and an annular disc base 203, is received in the knob 16L with the disc base 203 bearing against the annular disc 200. A spring washer 204, tensioning washers 205 and 206, and a retaining ring 207 are received in the indicated order on the cylindrical head 202 within the interior of the knob 16L. The retaining ring 207 engages a circumferential groove 208 on the interior of the knob 16L so as to urge the respective components into a compacted interior engagement, as shown in FIGURE 4. The cylindrical head 202 is affixed to the shaft 14 in a conventional manner, as by set screw arrangements indicated schematically by the reference letter S' in the drawings.

Preferably, the annular disc 200 is formed of a material such as cork, and the hub element 201 is formed of a non-slip resilient plastic, such as nylon or polyformaldehyde (e.g., "Delrin," Du Pont Company, Wilmington, Delaware), although other comparable materials could be utilized to achieve a desired frictional interfacial engagement. The spring washer 204 and tensioning washers 205 and 206 are dimensioned to insure an appropriate amount of interfacial tension between the adjacent surfaces of the annular disc 200 and the disc base 203 of the hub element 201. In this manner, manually induced rotation of the knob 16L will effect rotation of the shaft 14 via the frictional interengagement between the juxtaposed discs 200 and 203. However, an excess applied torque will cause slippage between the knob 16L and the shaft 14. Thus, a simple and reliable slip clutch arrangement is described for the operation of the subject invention.

A hollow cylindrical shaft 20 is concentrically positioned upon the shaft 14 for rotation therewith. As shown in FIGURES 3, 4, and 7, the shaft 20 extends between the flanges 12C and 12R. A series of actuating cam-levers 21–28 is affixed to the shaft 20 for rotation therewith. The cam-levers 21–28 extend from the shaft 20 at consecutive axial intervals and in circumferentially staggered relationship to each other. In the described embodiment, the cam-levers 21–28 are wedge-shaped elements, and the locus of a line tangent to the outermost extreme of each of the cam-levers 21–28 defines a generally helical segment, the axis of which coincides with the axis of the shafts 14 and 20.

Each such wedge-shaped cam-lever comprises two diverging radial extremes R and an interconnecting arcuate circumferential extreme A, as indicated by 21A and 22R in FIGURE 9.

A second shaft 30 is rigidly positioned in the housing 10 between the flanges 12C and 12R. The shaft 30 is positioned above and parallel to the shafts 14 and 20 on the interior or rear side of the housing 10. A series of crank members 31–38 is affixed to the shaft 30 for rotation relative thereto. The crank members 31–38 are arranged on the shaft 30 at consecutive axial intervals in corresponding one-to-one alignment with the actuating cam-levers 21–28. As best shown by FIGURE 9, which illustrates the crank member 31, each of the crank members comprises a centrally disposed collar portion C' through which the shaft 30 passes; a downwardly extending lever portion L'; an upwardly extending lever portion L; and a gear segment member G', which extends through a slot S provided in the housing 10 (see FIGURES 4, 5, 7, and 8).

A shaft 40 is rigidly positioned in the housing 10 and is carried by the flanges 12L, 12C, and 12R thereof on the exterior or front face of the housing 10. The shaft 40 is positioned in the vicinity of the line of intersection of the frames 10T and 10B, for a purpose hereinafter described. A series of gear members 41–48 is mounted on the shaft 40 between the flanges 12C and 12R. The gear members 41–48 are arranged at consecutive axial intervals on the shaft 40 in corresponding one-to-one alignment with the crank members 31–38. As illustrated in FIGURE 9, which shows the gear member 41, each of the gear members comprises a collar portion C which receives the shaft 40 therethrough and a gear portion G which is adapted to intermesh with the gear portion G' of the corresponding crank member. A series of Z-shaped arms 71–78 is provided to interconnect each of the gear members 41–48 with a corresponding one of the plates 51–58. As best seen in FIGURE 3, the arms 71–78 are arranged in consecutive intervals corresponding in one-to-one alignment with the gear members 41–48. Each collar C is affixed to one leg of its associated Z-shaped arm, and the opposite leg of the said arm is affixed to the corresponding one of the plates 51–58.

The plates 51–58 are generally similar and conform, on either side thereof, to the plate 51 illustrated in FIGURE 3. As shown therein, a grid 60 is affixed to the surface of the plate, which grid is provided with apertures for the reception of suitable informative indicia, in a generally similar fashion to the grids 11T and 11B affixed to the frames 10T and 10B, as previously described.

A series of bearing collar members 91–98 is also carried by the shaft 40. These bearing collar members 91–98 are generally similar to the gear members 41–48 except that the gear portions G of the gear members 41–48 are absent from the bearing collar members 91–98. A series of Z-shaped arms 101–108 interconnects the respective plates 51–58 and the bearing collar members 91–98, in the same fashion that the series of Z-shaped arms 71–78 interconnects the same respective plates 51–58 with the gear members 41–48.

A series of U-shaped leaf spring members 81–84 is affixed to the frame 10T at spaced consecutive intervals in corresponding one-to-one alignment with the crank members 31–34, for a purpose hereinafter described.

In operation, the device 2 is provided with suitable informative indicia on the grids 60 of each of the plates 51–58 (on either side thereof) and, if desired, the grids 11T and 11B are similarly treated. When the device 2 is then in the position shown in FIGURES 3 and 5, it is apparent that the indicia appearing on the top face of the plate 51 and the indicia appearing on the front of the frame 10T will be visible through the glass or other transparent enclosure 3 of the unit 1. In order to leaf through the plurality of stacked discs 51–58 so as to view the indicia contained on the bottom side of the plate 51 or on either side of the remaining plates, the consumer need only rotate either of the knobs 16L or 16R in the direction indicated by the arrow in FIGURE 1. The described rotation of either of the knobs 16L or 16R will effect a corresponding rotation of the shaft 14, by means of the clutch assemblies 18L and 18R, as previously described. The induced rotation of the shaft 14 will cause a radial extreme 21R of the actuating cam-lever 21 to engage the downwardly extending lever portion L' of the crank member 31 such that the crank member 31 is cam induced to rotate in the direction indicated by the arrow in FIGURE 5. This rotation of the crank member 31 causes the gear portion G' of the crank member 31 to rotate in the same direction and thereby to rotate the gear member 41 in the opposite direction. The described movement of the gear member 41 causes the plate 51 to move in the direction of the arrow in FIGURE 6 until the plate 51 assumes a substantially vertical upward disposition in parallel alignment with the frame 10T, such as is illustrated for the plate 51 in FIGURE 8. At this stage, the arcuate circumferential extreme 21A of the cam-lever 21 engages the extreme end of the downwardly extending lever portion L' of the crank member 31 and wedge locks the crank lever 31 in the indicated disposition, which defines an over-center relationship for the plate 51 relative to the shaft 40, that is, a stable position of equilibrium as the plate 51 bears against the frame 10T in parallel alignment therewith.

It should be observed that the described actuation of the crank member 31 also causes the upwardly extending lever portion L thereof to engage the free end of the U-shaped leaf spring member 81 and thereby to compress the leaf spring 81. At this stage of the operation, the consumer is enabled to see the indicia contained on the bottom side of the plate 51, as well as the indicia contained on the top side of the plate 52. This position will be maintained until either of the knobs 16L or 16R are rotated one way or the other. If it is desired to replace the device 2 to its original disposition (as shown in FIGURE 3), it is only necessary to reverse the rotation of either of the said knobs (i.e., in a direction opposite to the direction of the arrow in FIGURE 1) by a slight amount such that the circumferential extreme 21A of the actuating cam-lever 21 is withdrawn from locking engagement with the downwardly extending lever portion L' of the crank member 31. When the crank member 31 is released as described, the leaf spring 81 will flex outwardly so as to cause a slight movement of the crank 31 in a direction opposite to the direction of the arrow in FIGURE 5. As the crank member thus rotates, the plate 51 is caused to rotate in a direction opposite to the direction of the arrow in FIGURE 6 to an unstable over-center position relative to the shaft 40, at which time the plate 51 is gravity induced to return to its normal rest position in generally parallel relationship with the frame 10B. The gravity induced fall of the plate 51 causes a reversed drive of the shaft 14, as the gear driven lever portion L' bears against the radial extreme 21R of the cam-lever 21, thereby urging the cam-lever 21 out of the path of rotation of the crank member 31.

If, however, it is desired to leaf further through the plates after the plate 51 has been elevated to the previously described wedge locked position of parallel alignment with the frame 10T, it is only necessary to continue the described rotation of either of the knobs 16L or 16R in the direction indicated by the arrow in FIGURE 1 such that any or all of the plates 52–58 will be correspondingly rotated to a substantially vertical upward disposition in parallel alignment with the frame 10T, such as is illustrated for the plates 51–53 in FIGURE 8. For example, continued rotation of either of the knobs 16L or 16R in the direction indicated by the arrow in FIGURE 1 will effect the following sequence of events: A radial extreme 22R of the cam-lever 22 will engage the downwardly extending lever portion L' of the crank member 32 and will cause that member to rotate in the direction of the arrow in FIGURE 5, which in turn will cause the plate 52 to rotate in the direction of the arrow in FIGURE 6. The described rotation of the crank member 32 will cause the upwardly extending lever portion L thereof to engage the free end of the U-shaped leaf spring member 82 and thereby to compress the leaf spring 82. While the radial extreme 22R of the cam-lever 22 is rotating the crank member 32, as described, the arcuate circumferential extreme 21A of the cam-lever 21 slides past the extreme end of the downwardly extending lever portion L' of the crank member 31, thereby maintaining the crank member 31 in its wedge locked position. Prior to rotation of the cam-lever 21 completely past the extreme end of the crank member 31, the arcuate circumferential extreme 22A of the cam-lever 22 will engage the extreme end of the crank member 32, thereby wedge-locking the crank member 32 in a manner similar to that described for the crank member 31. At this stage, both of the plates 51 and 52 will be wedge-locked in the desired substantially vertical upward disposition in parallel alignment with the frame 10T by virtue of the wedge-locking of the crank members 31 and 32 by the arcuate circumferential extremes 21A and 22A of the cam-levers 21 and 22 respectively. If it is desired to leaf still further through the plates, the continued rotation of either of the knobs 16L or 16R in the indicated direction will cause a radial extreme 23R of the cam-lever 23 to engage the lever portion L' of the crank member 33, thereby effecting rotation of the crank member 33 and of the plate 53. This continued rotation eventually releases the arcuate circumferential extreme 21A of the cam-lever 21 from engagement with the crank member 31, although the crank member 32 is still maintained in a wedge-locked position as the arcuate circumferential extreme 22A of the cam-lever 22 slides past the extreme end of the lever portion L' of the crank member 32. Continued rotation will achieve a state of positioning such that both of the crank members 32 and 33 are wedge-locked by the corresponding arcuate circumferential extremes 22A and 23A of the cam-levers 22 and 23 respectively. Thus, even though the crank member 31, and therefore the plate 51, are no longer wedge-locked into the previously indicated position, the wedge-locking of the crank members 32 and 33, and therefore of the plates 52 and 53 respectively, will insure that all of the plates 51–53 which have been rotated to the substantially vertical upward disposition in parallel alignment with the frame 10T will be retained in that position. The remaining plates 54–58 can be correspondingly rotated in the manner described for the plates 51–53.

It will be observed that no spring members corresponding to the spring members 81–84 are provided for the crank members 35–38 (and correspondingly for the plates 55–58). The reason for this discrepancy in the symmetry of the device 2 is that the plate 55 would normally be situated in an unstable over-center position relative to the shaft 40 when it is rotated upwardly to its substantially vertical upward disposition in parallel alignment with the frame 10T. By virtue of this unstable over-center relationship, a slight reversal of either of the knobs 16L or 16R will release the arcuate circumferential extreme 25A of the cam-lever 25 from engagement with the extreme end of the lever portion L' of the crank member 35 and will thereby allow the said plate 55 to fall by gravity back to the downward position illustrated in FIGURE 8, without the aid of any auxiliary spring push to reach the said unstable over-center position, as is required for the plates 51–54. The same phenomenon of inherent instability due to over-centered positioning is, of course, true for the plates 56–58.

Also, it should be noted that the previously described slip clutch assemblies 18L and 18R will prevent malfunctioning and damaging of the system. For example, if the knob 16L should be rotated in a direction opposite to the arrow of FIGURE 1 when all of the plates 51–58 are in the downward disposition shown in phantom lines in FIGURE 1 (i.e., the disposition of FIGURE 5), the cam-lever 28 would engage the crank member 38 and would prevent the shaft 14 from rotating since the crank member 38 could not possibly rotate in the direction which would be induced by the torque resulting from the indicated contact of the cam-lever 28 with the crank member 38 (i.e., the direction opposite to the direction of the arrow in FIGURE 5). This torque, however, is dissipated by slippage of the knob 16L relative to the shaft 14 via the clutch assembly 18L. In this manner, a rupturing or other damaging of the various components of the system is obviated when user inadvertently attempts to rotate either of the knobs 16L or 16R in the improper direction for a given state of events. Similarly, the clutch assemblies 18L and 18R prevent unwarranted damage to the various intermeshing gears G and G' as the user leafs through the plates 51–58 either in the forward sense (i.e., manually induced gear drive from the downward to the upward dispositions) or in the reverse sense (i.e., gravity induced reversed gear drives from the upward to the downward dispositions).

By the described arrangement, it should be apparent that a simple scheme is provided for leafing through a plurality of stacked plates which are rotated through a horizontal plane about a horizontally disposed shaft. The plates may be rotated upwardly to a locked vertical position from a generally downwardly disposed disposition through a horizontal plane as desired by a manually operated gear drive which is responsive to rotation of a knob in a given direction. The effects of gravity are utilized in the reversed downward rotation of the said plates in response to a manual signal predicated upon a reversed rotation of the said knob from the indicated given direction. Also, where required, spring means are provided to push off the plates from their generally vertical disposition to an unstable over-center relationship relative to the axis of rotation for the plates such that the gravity induced downward rotation through the horizontal plane may be readily achieved. A compact and inexpensive arrangement is thus provided for leafing through a plurality of stacked plates with a minimum of space being required and with a minimum of manual operation being required to complete the operation through all of its various phases.

It should be understood that various changes, modifications, and alterations may be made in the details of construction and arrangements for the various elements constituting the subject invention, without departing from the spirit and the scope thereof, as defined in the appended claims.

What is claimed is:

1. A program holder assembly adapted to leaf through a plurality of stacked plates containing informative indicia thereon comprising:
   a housing;
   a first shaft rigidly positioned in the housing;
   a plurality of plates containing informative indicia on either side thereof and adapted for arrangement in stacked super-imposed relationship;
   a series of collar members rotatably affixing each of the plates to the first shaft, the said collar members being carried by the first shaft at consecutive axial intervals thereon and each having a gear member affixed thereto;
   a second shaft rigidly positioned in the housing;
   a series of crank members, one for each plate, rotatably carried by the second shaft at consecutive axial intervals thereon;
   a gear member on each crank member which intermeshes with the said gear member of each collar member;
   a third shaft rotatably journaled in the housing;
   a series of actuating levers carried by the third shaft, one for each plate, the said actuating levers extending from the third shaft at consecutive axial intervals in circumferentially staggered relationship to each other and in corresponding one-to-one alignment with the crank members; and
   means for rotating the third shaft relative to the housing, whereby each of the actuating levers consecutively engages each of the crank members so as to gear drive each of the plates for rotation relative to the housing.

2. A program holder assembly as claimed in claim 1 in which the said means for rotating the third shaft relative to the housing comprises:
   a manually operable knob; and
   a slip clutch interconnecting the knob and the third shaft.

3. A program holder assembly as claimed in claim 1 and further comprising spring means for positioning a given plate in an unstable over-center disposition relative to the said first shaft such that gravity may cause the said given plate to rotate about the said first shaft.

4. A program selector adapted to leaf through a plurality of stacked plates containing informative indicia thereon comprising:
   a housing comprising first and second intersecting frames, the first frame being substantially vertical and the second frame extending therefrom;
   a first shaft rigidly positioned in the housing and extending parallelly to the line of intersection of the said frames;
   a plurality of plates containing informative indicia on either side thereof;
   a series of collar means rotatably carried by the first shaft at consecutive axial intervals thereon;
   a series of first gear means, one of which is affixed to each collar means;
   means affixing each of the said plates to one of the said collar means such that the plates may be arranged in stacked superimposed relationship relative to either of the said frames;
   a second shaft rigidly positioned in the housing;
   a series of crank means, one for each plate, rotatably carried by the second shaft at consecutive axial intervals thereon;
   a series of second gear means, one of which is affixed to each crank means, and each of said second gear means intermeshing with one of the said first gear means associated with each collar means;
   a third shaft rotatably journaled in the housing;
   a series of actuating means carried by the third shaft, one for each plate; and
   means for rotating the third shaft relative to the housing, whereby each of the actuating means consecutively engages the corresponding one of the crank means so as to gear drive each of the plates in succession for rotation relative to the housing about a horizontal axis of rotation.

5. A program selector as claimed in claim 4 in which the said means for rotating the third shaft relative to the housing comprises:
   a manually operable knob; and
   a slip clutch interconnecting the knob and the third shaft.

6. A program selector as claimed in claim 4 and further comprising spring means for positioning a given plate in an unstable over-center disposition relative to the said first shaft such that gravity may cause the said given plate to rotate about the said first shaft.

7. A device for positioning a stacked plurality of plates in a predetermined orientation comprising:
   a housing;
   a horizontally disposed shaft rigidly positioned in the housing;
   a plurality of plates, the said plates being adapted for positioning in stacked superimposed relationship;
   means rotatably affixing each of the said plates to the said shaft;
   spring means for positioning a given plate in an unstable over-center disposition relative to the said shaft such that gravity may cause the said given plate to rotate about the said shaft;
   gear means adapted to drive each of the said plates for rotation relative to the said shaft through a horizontal plane; and
   drive means for actuating said gear means so as to rotate each of the said plates one at a time.

8. A device for positioning a stacked plurality of plates in a predetermined orientation comprising:
   a housing;
   a first shaft rotatably journaled in the housing;
   means for rotating the first shaft relative to the housing;
   a second shaft rigidly positioned in the housing;
   a stacked plurality of plates affixed to the second shaft for rotation relative thereto;
   spring means for positioning a given plate in an unstable over-center disposition relative to the said second shaft such that gravity may cause the said given plate to rotate about the said second shaft; and
   gear means responsive to rotation of the first shaft for rotating a predetermined one of the said plates about the second shaft whereby each of the said plates may be positioned in a predetermined orientation relative to the housing.

References Cited by the Examiner
UNITED STATES PATENTS

| | | | |
|---|---|---|---|
| 2,375,228 | 5/1945 | Kelsey | 40—104 |
| 2,660,904 | 12/1953 | Hilsinger | 74—553 |
| 2,833,158 | 5/1958 | Damon | 74—527 |

JEROME SCHNALL, *Primary Examiner.*